(12) United States Patent
Mellert et al.

(10) Patent No.: US 12,716,795 B2
(45) Date of Patent: Aug. 25, 2026

(54) MEASURING ARRANGEMENT AND METHOD FOR OPERATING A MEASURING ARRANGEMENT

(71) Applicant: VEGA Grieshaber KG, Wolfach (DE)

(72) Inventors: Martin Mellert, Steinach (DE); Bernhard Weller, Donaueschingen (DE); Jochen Huber, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 301 days.

(21) Appl. No.: 18/347,214

(22) Filed: Jul. 5, 2023

(65) Prior Publication Data

US 2024/0011857 A1 Jan. 11, 2024

(30) Foreign Application Priority Data

Jul. 5, 2022 (DE) .................... 10 2022 116 708.9

(51) Int. Cl.
*G01L 9/12* (2006.01)
*G01L 9/00* (2006.01)
(Continued)

(52) U.S. Cl.
CPC ........ *G01L 9/0072* (2013.01); *G01L 19/0672* (2013.01); *G01N 27/223* (2013.01)

(58) Field of Classification Search
CPC .. G01N 27/223; G01N 27/048; G01N 27/605; G01N 2201/0238; G01L 9/0072;
(Continued)

(56) References Cited

U.S. PATENT DOCUMENTS 5,571,970 A * 11/1996 Mutoh .................... G01L 9/125 73/723
6,185,987 B1 * 2/2001 Lehmann .............. G01M 3/186 73/49.3
(Continued)

FOREIGN PATENT DOCUMENTS

DE 102009002662 A1 * 10/2010 ............ G01F 23/18
DE 10 2014 201 529 A1 7/2015
EP 1186875 B1 * 9/2007 ............ G01L 9/125

OTHER PUBLICATIONS

DE 10 2022 116 708.9 Office Action dated Mar. 16, 2023.

*Primary Examiner* — Herbert K Roberts
(74) *Attorney, Agent, or Firm* — Wood Herron & Evans LLP

(57) ABSTRACT

The present invention relates to a measuring arrangement for determining a pressure of a fluid comprising a pressure measuring cell having a measuring chamber formed by a base body and a membrane arranged on the front side of the base body spaced apart circumferentially and able to be deformed by means of the pressure of the fluid. At least one membrane electrode is arranged on the membrane, and at least one base body electrode arranged opposite thereto on the base body, so that a distance between the membrane electrode and the base body electrode changes due to a pressure change of the fluid acting on the membrane, from which a change in capacitance can be detected. The measuring arrangement has a measuring device for determining a current flowing between the at least one membrane electrode and the at least one base body electrode.

18 Claims, 2 Drawing Sheets

(51) Int. Cl.
*G01L 19/06* (2006.01)
*G01N 27/22* (2006.01)

(58) Field of Classification Search
CPC .. G01L 9/0073; G01L 9/0075; G01L 19/0672
See application file for complete search history.

(56) References Cited

U.S. PATENT DOCUMENTS

| | | | | |
|---|---|---|---|---|
| 6,586,943 | B1 | 7/2003 | Masuda et al. | |
| 2013/0019687 | A1* | 1/2013 | Wosnitza | G01L 19/0654<br>73/700 |
| 2013/0162270 | A1* | 6/2013 | Kishida | G01L 9/0072<br>324/661 |
| 2013/0292264 | A1* | 11/2013 | Hou | G01N 27/3274<br>73/1.06 |
| 2024/0003731 | A1* | 1/2024 | Heo | G01F 23/242 |

* cited by examiner

Fig. 3

MEASURING ARRANGEMENT AND METHOD FOR OPERATING A MEASURING ARRANGEMENT

CROSS REFERENCE TO RELATED APPLICATIONS

This application claims priority to German Application No. DE 10 2022 116 708.9 filed Jul. 5, 2022, which is hereby incorporated by reference in its entirety.

FIELD OF THE INVENTION

The present invention relates to a measuring arrangement for determining a pressure of a fluid comprising a pressure measuring cell and in particular a design of such a measuring arrangement comprising an integrated moisture detection. The present invention further relates to a method for the moisture detection in such a measuring arrangement.

BACKGROUND OF THE INVENTION

Measuring arrangements for determining a pressure of a fluid by means of pressure measuring cells are known in various embodiments from the prior art. Such measuring arrangements often have capacitive pressure measuring cells, which can convert a pressure acting on a membrane of a pressure measuring cell into an electrical signal. Fluids according to the present application comprise liquids, gases, and mixtures thereof.

A pressure measuring cell is known, for example, from EP 1 186 875 B1.

Such a pressure measuring cell generally consists of a base body and a measuring membrane, which can be deformed by means of a pressure to be measured and which is arranged on the base body via a circumferential joint. Circular electrodes, which, together, form a measuring capacitor, the measuring signal of which is evaluated, are preferably provided on a side of the base body facing the membrane and on a side of the membrane facing the base body. In order to compensate disruptive effects, such as, for example, temperature or drift, a reference capacitor is arranged so as to surround the measuring capacitor in a ring-shaped manner.

The measuring and reference capacitor can also be formed so that one of the electrodes, thus membrane electrode or base body electrode, is formed in fully covering manner, and the other electrode is formed in a structured manner, for example in a circular electrode and a second electrode surrounding the circular electrode in a ring-shaped manner.

It is important to note at this point that the two formed capacitors will be identified below as measuring capacitor and reference capacitor. The measuring capacitor as well as the reference capacitor changes its capacitance in response to a deflection, for example by means of pressurization of the membrane, due to changes in distance of the electrodes. External influences can be compensated due to the fact, however, that in the case of the reference capacitor, due to the arrangement thereof on an edge of the membrane, is smaller in the vicinity of the joint than in the case of the measuring capacitor, and due to the fact that the ratio is known, in which measuring capacitor and reference capacitor change due to the pressure.

It is a known problem in the case of measuring arrangements comprising pressure measuring cells of this type that when they are formed as relative pressure measuring cells, i.e. when a measuring chamber, which is formed by the membrane and the base body, is pressurized with an ambient pressure and is in fluid contact with the surrounding area of the pressure measuring cell for this purpose, humidity can penetrate into the measuring chamber and changes the permittivity of the medium, which is present in the measuring chamber, there. Such changes of the permittivity of the air-water vapor mixture located in the plate capacitor formed there as dielectric can be partially compensated by means of a measurement of the measuring and reference capacitance because these effects act equally on both formed capacitors.

It is nonetheless important to detect when an increased humidity prevails in the measuring chamber of the pressure measuring cell and/or when a surface condensation has occurred.

Methods for detecting moisture are known in the prior art, in the case of which charging and recharging processes of the capacitors to a further capacitor of known size, which is arranged in an electronic measuring equipment, take place and the charging and recharging processes are evaluated in terms of time in order to be able to infer information as to whether or not an increased moisture prevails in the measuring chamber.

These methods have the disadvantage that the realization thereof is elaborate due to complex measurement evaluations and that they are energy-intensive due to the frequent recharging processes between the capacitors, which can be problematic in particular in the case of autonomous measuring arrangements, which are supplied with energy via a battery and, for example, energy harvesting. These methods for the moisture detection further have only a low resolution, so that small changes cannot be detected.

SUMMARY OF THE INVENTION

It is the object of the present invention to further develop a measuring arrangement, in particular a capacitive pressure measuring cell, and a method for operating such a measuring arrangement in such a way that they overcome the disadvantages of the prior art.

A measuring arrangement according to the invention for determining a pressure of a fluid comprising a pressure measuring cell, which has a measuring chamber, which is formed by means of a base body and a membrane, which is arranged circumferentially on the front side of the base body so as to be spaced apart, wherein the membrane can be deformed by means of the pressure of the fluid, at least one membrane electrode arranged on the membrane, and at least one base body electrode arranged opposite thereto on the base body, wherein a distance between the at least one membrane electrode and the at least one base body electrode changes due to a pressure change of the fluid acting on the membrane, so that a change in capacitance can be detected, is characterized in that the measuring arrangement has a measuring device for determining a current flowing between the at least one membrane electrode and the at least one base body electrode.

By means of a measurement of the current flowing between the electrodes, a conclusion can be drawn to the humidity and a surface conductivity in the measuring chamber. The higher the current flowing between the electrodes, the higher the humidity or the surface conductivity, respectively, which is created, for example, by means of a condensation of the humidity on walls of the measuring chamber.

A summary measurement of the current can take place between the electrodes, or, in the case of structured electrodes, thus when a measuring electrode and a reference electrode for forming a measuring capacitor and a reference capacitor are provided, for example, on the base body and/or the membrane, the current can be measured separately based on the measuring capacitor and the reference capacitor.

The measuring device for this can be formed, for example, as current measuring device. Such a current measuring device can be realized by means of a measuring resistor and a voltage measurement or a Hall sensor for the current measurement. The realization via a measuring resistor has the advantage that the latter can be implemented very easily and in good precision in an integrated circuit, so that a simple, precise, and cost-efficient determination of the current can take place.

In one design, a basic potential of the measuring arrangement, in particular a ground potential, is applied to the membrane electrode, and a measuring potential of the measuring arrangement is applied to the at least one base body electrode. A defined voltage prevails between the electrodes in this way and a certain amount of charge flows to the electrodes. When an increased humidity or surface conductivity exists, charge flows off in the direction of the ground potential. The amount of charge flowing off in the direction of the ground potential is a measure for the moisture in the measuring chamber.

In a simple design, the determination of the current flowing between the at least one membrane electrode and the at least one base body electrode can take place by means of a measurement of a current flowing to the electrode with the measuring potential in a quasi-static state.

In the present application, a quasi-static state is understood to be a defined period of time with constant or approximately constant boundary conditions. The boundary conditions can comprise, for example, the externally acting pressure, a temperature of the measuring cell, an ambient pressure, as well as the absence of external mechanical impacts, for example shocks or vibrations, respectively.

A measurement for a period of time of 100 ms is sufficient for a sufficiently exact determination of the current and thus of the moisture. Parameters, such as temperature and ambient pressure, can be assumed to be constant within this period of time. Should temperature jumps appear nonetheless, for example, they can be detected and considered via an integrated temperature sensor.

The measuring capacitance and the reference capacitance are advantageously considered in order to determine the moisture, i.e. current flowing at the measuring capacitance and a current flowing at the reference capacitance are determined separately. Effects, which act equally on the measuring capacitance and the reference capacitance, such as, for example, a change of the ambient pressure, a change of the temperature, or a change of the pressure acting on the membrane, can be compensated computationally in this case.

A voltage between the at least one membrane electrode and the at least one base body electrode can advantageously be kept constant. This has the advantage that a constant voltage can be provided very easily, for example by means of a constant voltage source or a voltage regulator and is resistant to noise. Alternatively, a constant current can also be set by means of a current regulator.

In one variation, in which the membrane electrode is connected to ground potential, the measuring arrangement can be designed and connected so that the measuring device is formed for measuring the current flowing to the at least one base body electrode and/or a charge flowing to at least one base body electrode.

At least a first base body electrode and a second base body electrode are advantageously arranged on the base body, wherein in particular the first base body electrode is formed as measuring electrode and the second base body electrode as reference electrode. It has been shown that from a production-related aspect, it is easier when a structuring of the electrodes takes place on the base body and when the membrane is formed with a fully covering electrode, in particular a fully covering metallization. A design as measuring electrode means that a pressure change generally affects a measuring capacitor, which is formed with this electrode, more strongly than a reference capacitor, which is formed with the reference electrode.

In this design, the measuring electrode can preferably be formed to be circular and the reference electrode preferably in a ring-shaped manner so as to surround the measuring electrode. As already noted, a design with a measuring capacitor and a reference capacitor is helpful in order to compensate for effects, which act equally on both capacitors, during the pressure measurement. This could be effects, for example temperature effects, which are caused by humidity.

In a design of this type, the measuring device can be formed to determine the current flowing to the measuring electrode and the current flowing to the reference electrode and/or the charge flowing to the measuring electrode and the charge flowing to the reference electrode.

In a preferred design, the measuring device is formed as integrated circuit. A design of this type has the advantage that a complete integration of the measuring device into an electronic measuring equipment of the measuring arrangement can take place. For example, available controllers or ASICs can be used in this way for the calculations, which are necessary to determine the moisture.

A method according to the invention for detecting moisture in a measuring arrangement according to the preceding description is characterized in that a current flowing between at least one membrane electrode and at least one base body electrode is determined and an absolute amount of moisture is determined therefrom, which is related to the temperature, and a relative moisture in the measuring chamber is determined.

The statements made with regard to the measuring arrangement apply for the design of the measuring method and vice versa.

To determine the current, the current can be measured directly. Alternatively, a determination of the current can take place via another measured variable, for example a voltage dropping via a measuring resistor.

In an advantageous design of the method, a basic potential of the measuring arrangement, in particular a ground potential, is applied to the at least one membrane electrode, and a measuring potential of the measuring arrangement is applied to the at least one base body electrode. In this design, a voltage is thus applied between the electrodes by means of the different potentials, by means of which a certain amount of charge appears on the electrodes. When an increased humidity or surface conductivity exists, charge flows off in the direction of the ground potential. The amount of charge flowing off in the direction of the ground potential is a measure for the moisture in the measuring chamber.

In an advantageous design of the method, a voltage between the membrane electrode and at least one base body electrode is kept constant.

A particularly simple determination of the current can take place when a current flowing to the at least one base body electrode and/or a charge flowing to at least one base body electrode is determined. It is assumed for this purpose that due to the otherwise constant or quasi-static boundary conditions, the inflowing current corresponds to the current, which flows from the membrane electrode to the base body electrode, or vice versa.

In order to be able to compensate for other influences during the moisture determination, it is advantageous when the measuring arrangement is formed with a measuring electrode and a reference electrode, which surrounds the measuring electrode in a ring-shaped manner, and the current flowing to the measuring electrode and the current flowing to the reference electrode is determined in order to determine the amount of moisture, and a relation of these currents to one another is additionally included. The moisture determination is realized by means of a calibration of the measuring cell to at least two moisture measured values and an exclusionary interpolation.

The moisture determination can be improved further when the measuring arrangement has one or several temperature sensors. They can be used for the temperature determination for a temperature compensation. For example, PTC resistors or diodes with a temperature-dependent characteristic curve can be used as temperature sensor. A static temperature component, in particular a temperature of the base body and/or a dynamic temperature component, in particular a temperature of the membrane, can be determined.

In a further developed design, the current is considered over a longer period of time, and a dynamic of the discharge is considered. A measurement takes place here in a period of time of up to 100 ms, and a conclusion to the parasitic current is drawn from the increase of the discharge. The system is also calibrated beforehand in this case.

Preferred embodiments, features, and characteristics of the measuring arrangement as proposed correspond to those of the method as proposed.

Advantageous designs and variations of the invention follow from the subclaims and the following description. The features listed individually in the subclaims can be combined in any, technically sensible manner with one another as well as with the features described in more detail in the following description and can represent other advantageous variations of the invention.

The present invention will be described in more detail below on the basis of exemplary embodiments with reference to the enclosed figures, in which:

BRIEF DESCRIPTION OF THE DRAWINGS

Figure 3:
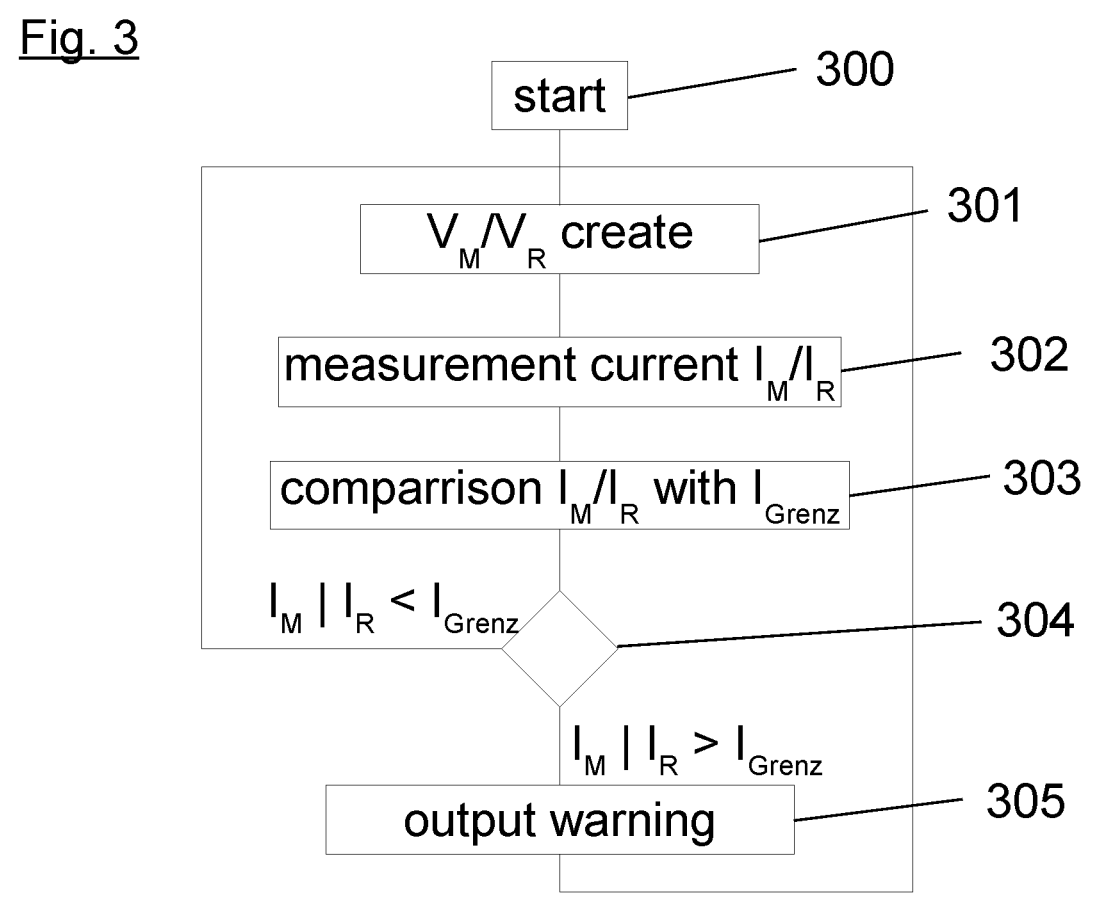

FIG. 3 shows a flowchart for an embodiment of a method according to the present application.

DETAILED DESCRIPTION OF THE DRAWINGS

Figure 1:
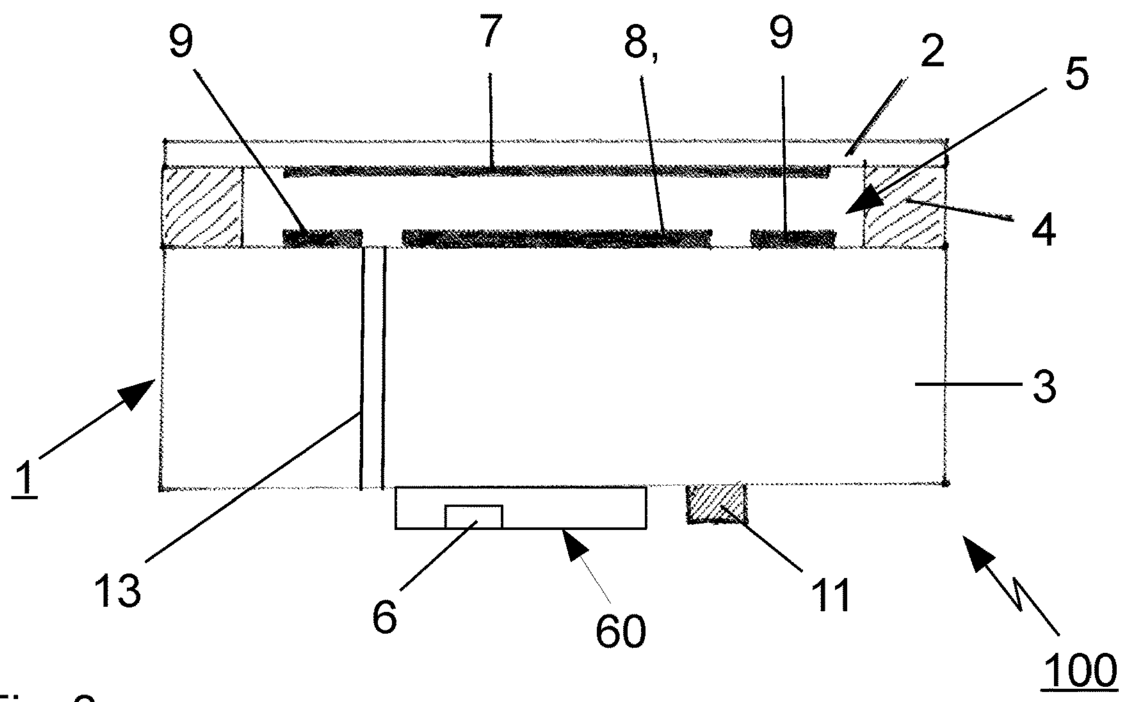
FIG. 1 shows a section through an exemplary embodiment of a pressure measuring cell.

In the figures, identical reference numerals refer to identical components or to components with identical function, which correspond with one another, unless specified otherwise.

FIG. 1 shows, in an exemplary manner, a measuring arrangement 100 comprising a pressure measuring cell 1 according to the present application, in the case of which the method of the present application can be used, in a section along a longitudinal axis.

The pressure measuring cell 1 is formed as ceramic pressure measuring cell 1, wherein a membrane 2, which can be deformed by means of the pressure of a medium fluid or gas acting on the membrane 2, is arranged on the front side of the pressure measuring cell 1. Via a circumferential spacer 4, which is formed from glass in the present case, the membrane 2 is fastened to a base body 3 of the pressure measuring cell 1, which likewise consists of a ceramic material.

A membrane electrode 7 is arranged on the membrane 2 on a surface of the membrane 2 facing the base body 3 and, located opposite thereto, a measuring electrode 8 as well as a reference electrode 9, which surrounds the measuring electrode 8 circumferentially, is arranged on the base body 3. In the present exemplary embodiment, the membrane electrode 7 and the measuring electrode 8 are formed in a circular manner, and the reference electrode 9 is formed in a ring-shaped manner. Due to a pressure change of the medium acting on the membrane 2, the membrane 2 is deformed and a distance between the membrane electrode 7 and the measuring electrode 8 changes, so that the value of a measuring capacitance $C_M$ measured there changes. The reference capacitance $C_R$ formed between membrane electrode 7 and the reference electrode 9 changes likewise, but at a ratio to the measuring electrode 8, which can be determined for each pressure measuring cell 1 and can thus be used to compensate negative influences on the measuring capacitance $C_M$ between the membrane electrode 7 and the measuring electrode 8.

In the present exemplary embodiment, the pressure measuring cell 1 is formed as relative pressure measuring cell, i.e. the measuring chamber 5 is in contact with an ambient pressure. In the present case, the ambient pressure is fed to the measuring chamber 5 via a pressure compensation hole 13.

The pressure measuring cell 1 further has a temperature sensor 11, which is located on the rear side of the base body 3 or which is attached to an electronic board located there. In the present case, the temperature sensor 11 is arranged on an electronic board, which supports an electronic measuring equipment 60 in the form of an application-specific, integrated circuit ASIC, in which the measuring device 6 in the form of a current measuring device 6 is integrated as well. A system temperature T of the pressure measuring cell 1 can be determined by means of the temperature sensor 11. Due to the fact that temperature impacts are to mainly be expected from the medium side, it can be assumed that the pressure measuring cell 1 as a whole has the system temperature T, which is measured on the rear side of the base body 3.

A determination of the moisture within the measuring chamber 5 is possible by means of the measuring device 6 and the electronic measuring equipment 60.

Figure 2:
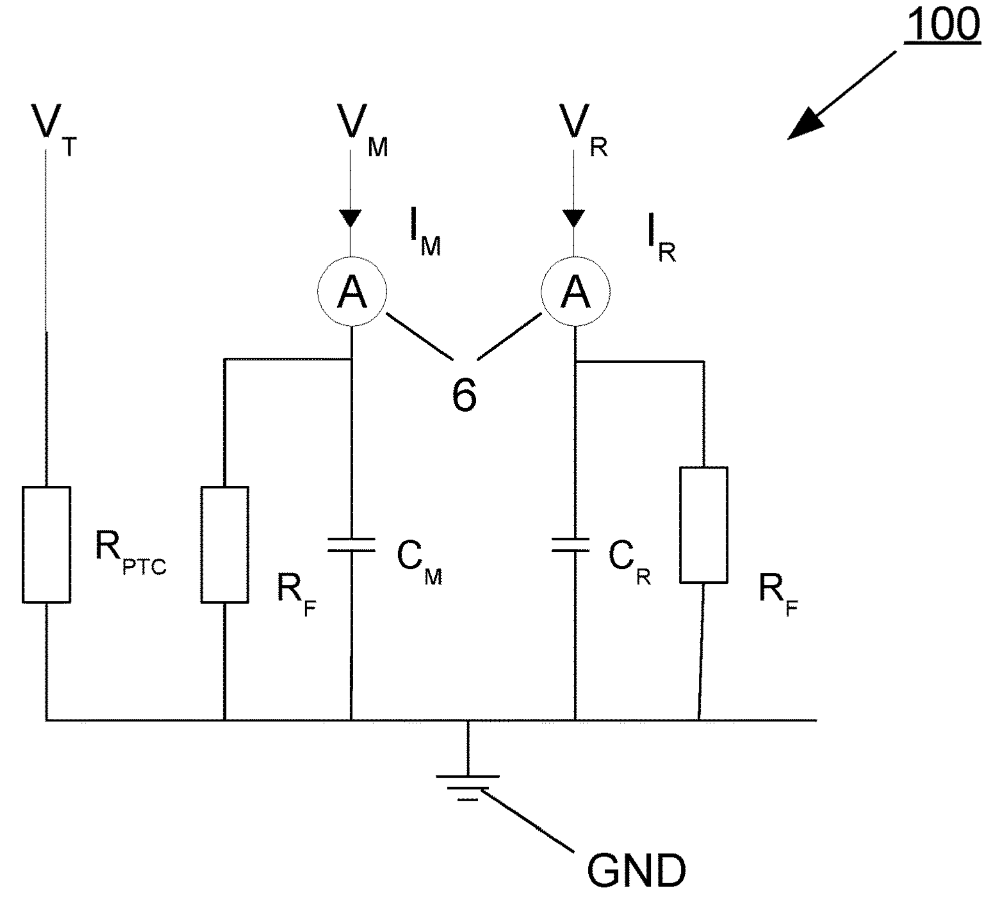
FIG. 2 shows an equivalent circuit diagram of the pressure measuring cell from FIG. 1.

FIG. 2 shows a simplified equivalent circuit diagram of the pressure measuring cell 1 from FIG. 1. The measuring capacitance $C_M$ and the reference capacitance $C_R$, each comprising a capacitor, are shown as equivalent circuit diagram. The measuring capacitor is connected on the one side to a measuring potential $V_M$ and on the other side to the ground potential GND of the circuit, so that a measuring voltage applies at the measuring capacitor. The reference capacitor is connected to a reference potential $V_R$ and the ground potential GND, so that a reference voltage applies at the reference capacitor accordingly. The measuring voltage and the reference voltage can be identical.

A resistor $R_F$, which serves as equivalent circuit diagram for a parasitic current path between the electrodes of the capacitors, via which a current flows between the electrodes, is in each case plotted parallel to the measuring capacitor and the reference capacitor. As a function of a moisture prevailing in the measuring chamber 5, more or less current flows over this parasitic current path, i.e. a size of the resistor $R_F$ varies as a function of the moisture. The higher the humidity and surface moisture in the interior of the measuring chamber 5, the smaller the resistor $R_F$ of the parasitic current path, and the more current flows over this resistor $R_F$.

Due to the fact that the capacitors do not conduct any current in direct current operation, it can approximately be assumed that all of the current, which flows towards the capacitors in a static or quasi-static state, flows off via the parasitic current path.

To determine the outflowing current, the inflowing current can thus be measured and thus provides information as to how high the moisture is in the interior of the measuring chamber 5. To determine this inflowing current, a current measuring device 6, which, in the present equivalent circuit diagram is illustrated as Amperemeter A, is in each case connected upstream of the measuring capacitor as well as the reference capacitor.

A PTC resistor $R_{PTC}$ is additionally arranged as equivalent circuit diagram for the temperature sensor in a path parallel to the capacitors, and a temperature measuring potential $V_T$ is applied thereto.

A method for determining the moisture in a measuring cell according to FIG. 1 runs as follows:

In a first step 301, the measuring potential $V_M$ is applied to the measuring capacitor, and the reference potential $V_R$ is applied to the reference capacitor, so that the measuring voltage is applied at the measuring capacitor, and the reference voltage is applied at the reference capacitor. As soon as the capacitors are charged completely, an amperage $I_M$ and $I_R$ of the current flowing over the current measuring devices 6 is measured in a second step 302.

The measured amperage is compared to a stored amperage $I_{Grenz}$ in a third step 303.

In a fourth step 304, if the measured amperage lies above a specified threshold value $I_{Grenz}$, a warning message is output in step 305.

The method starts again with the first step 301 subsequently and when the measured amperage lies below the stored threshold value.

LIST OF REFERENCE NUMERALS

1 pressure measuring cell
2 membrane
3 base body
4 spacer
5 measuring chamber
6 measuring device, current measuring device
7 membrane electrode
8 first base body electrode, measuring electrode
9 second base body electrode, reference electrode
11 temperature sensor
13 pressure compensation hole
60 electronic measuring equipment
100 measuring arrangement
$C_R$ reference capacitance
$C_M$ measuring capacitance
$I_M$, $I_R$ current
$I_{Grenz}$ threshold current
$R_{PTC}$ temperature sensor, PTC resistor
$R_F$ resistor
$V_T$ temperature measuring potential
$V_M$ measuring potential
$V_R$ reference potential
GND basic potential, ground potential

The invention claimed is:

1. A measuring arrangement for determining a pressure of a fluid comprising a pressure measuring cell, which has a measuring chamber, formed by means of a base body and a membrane arranged on the front side of the base body and spaced apart from said base body, wherein the membrane can be deformed by means of the pressure of the fluid, at least one membrane electrode arranged on the membrane, and at least one base body electrode arranged opposite thereto on the base body, wherein a distance between the membrane electrode and the base body electrode changes due to a pressure change of the fluid acting on the membrane, so that a change in capacitance can be detected, and wherein the measuring arrangement has a measuring device for determining a current and/or a charge flowing between the at least one membrane electrode and the at least one base body electrode, and for determining an amount of moisture in the measuring chamber from the current and/or charge flowing between the membrane electrode and the at least one base body electrode.

2. The measuring arrangement according to claim 1, wherein the measuring device is a current measuring device.

3. The measuring arrangement according to claim 1, comprising a voltage source configured to apply a ground potential to the membrane electrode, and apply a measuring potential of the measuring arrangement to the at least one base body electrode.

4. The measuring arrangement according to claim 3, wherein the voltage source is configured to maintain a constant voltage between the membrane electrode and the at least one base body electrode.

5. The measuring arrangement according to claim 1, wherein the measuring device is configured to determine a current flowing to the at least one base body electrode and/or a charge flowing to the at least one base body electrode.

6. The measuring arrangement according to claim 1, wherein at least a first base body electrode and a second base body electrode are arranged on the base body, wherein the first base body electrode is configured as measuring electrode and the second base body electrode is configured as reference electrode.

7. The measuring arrangement according to claim 1, wherein the measuring device is configured as an integrated circuit.

8. A method for detecting moisture in a measuring arrangement comprising a pressure measuring cell which has a measuring chamber formed by a base body and a membrane arranged circumferentially on the front side of the base body and spaced apart from said base body, wherein the membrane can be deformed by means of a pressure of a fluid, the method comprising:

arranging at least one membrane electrode on the membrane, and arranging at least one base body electrode opposite the membrane electrode on the base body, such that a distance between the membrane electrode and the at least one base body electrode changes due to a pressure change of the fluid acting on the membrane, determining a current and/or a charge flowing between the membrane electrode and the at least one base body electrode, and determining an amount of moisture in the measuring chamber from the current and/or charge flowing between the membrane electrode and the at least one base body electrode.

9. The method according to claim 8, further comprising measuring the current flowing between the membrane electrode and the at least one base body electrode.

10. The method according to claim 8, further comprising applying a ground potential to the membrane electrode, and applying a measuring potential of the measuring arrangement to the at least one base body electrode.

11. The method according to claim 8, further comprising maintaining a constant voltage between the membrane electrode and the at least one base body electrode.

12. The method according to claim 8, further comprising determining a current flowing to the at least one base body electrode and/or a charge flowing to the at least one base body electrode.

13. The method according to claim 8, wherein the measuring arrangement is configured with a measuring electrode and a reference electrode, which surrounds the measuring electrode in a ring-shaped manner, the method further comprising determining a current flowing to the measuring electrode and a current flowing to the reference electrode in order to determine the amount of moisture.

14. The method according to claim 13 further comprising determining a relationship of the current flowing to the measuring electrode and the current flowing to the reference electrode.

15. A method for detecting moisture in a pressure measuring cell, comprising:

providing the pressure measuring cell, said pressure measuring cell comprising a measuring chamber formed by a base body and a membrane arranged circumferentially on the front side of the base body and spaced apart from the base body, wherein the membrane can be deformed by means of a pressure of the fluid, at least one membrane electrode arranged on the membrane, and at least one base body electrode arranged on the base body opposite the at least one membrane electrode;

applying a constant voltage between the membrane electrode and the at least one base body electrode;

determining a current flowing between the membrane electrode and the at least one base body;

determining an amount of moisture in the measuring chamber from the current.

16. The method according to claim 15, wherein applying a constant voltage comprises applying a ground potential to the membrane electrode and a constant measuring potential to the at least one base body.

17. The method according to claim 15, further comprising providing a reference electrode which surrounds the at least one base body electrode in a ring-shaped manner, wherein determining an amount of moisture further comprises determining a current flowing to the reference electrode.

18. The method according to claim 17, wherein determining an amount of moisture comprises determining a relationship between the current flowing to the at least one base body electrode, the current flowing to the reference electrode, and the amount of moisture in the chamber.

* * * * *